Dec. 4, 1923.
S. F. BAUWENS
WIRE JOINING TOOL
Filed Nov. 26, 1920
1,476,388
3 Sheets-Sheet 1
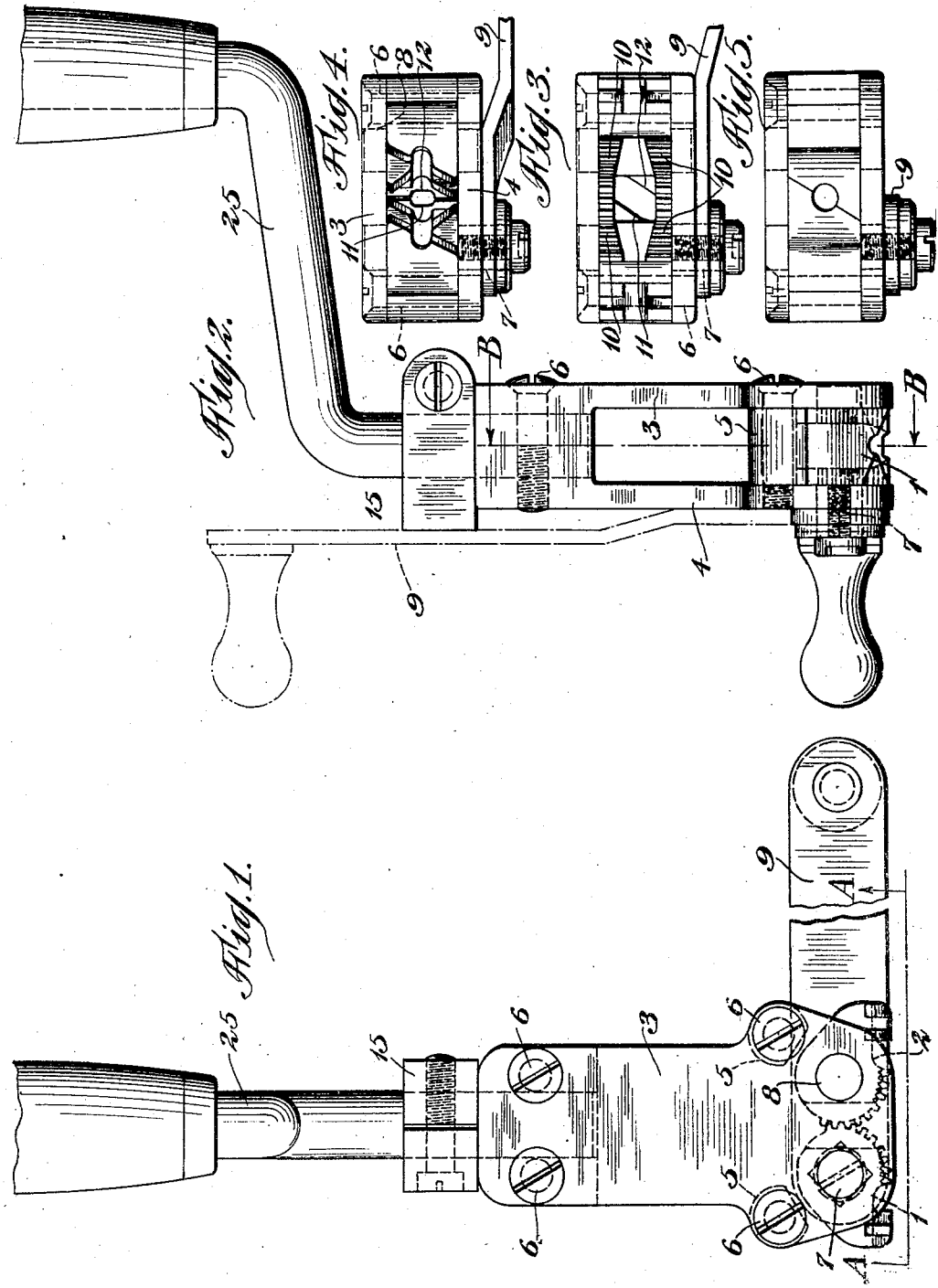
INVENTOR
Seraphine F. Bauwens
BY Edward F. Dumel Jr.
ATTORNEY

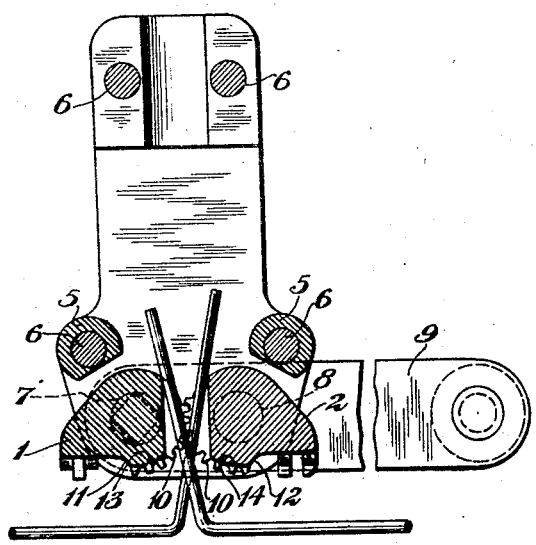
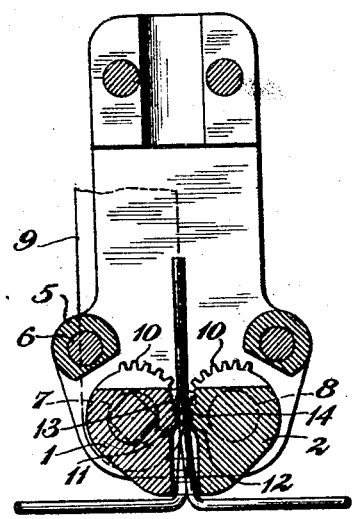
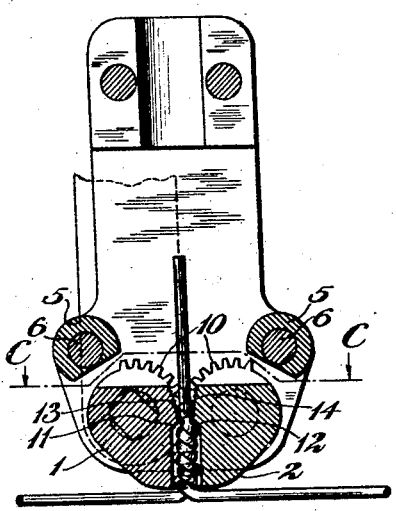
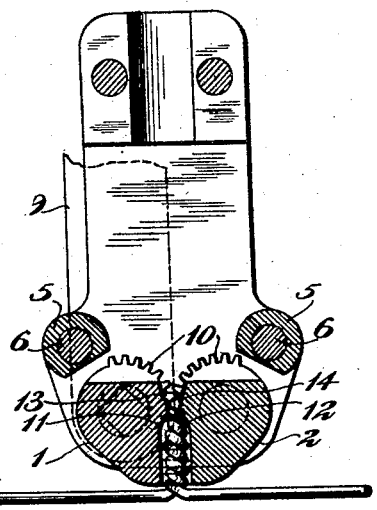
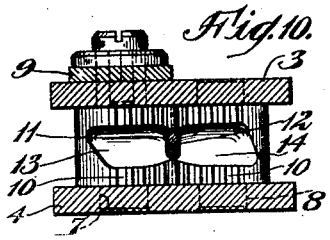

Dec. 4, 1923.

S. F. BAUWENS
WIRE JOINING TOOL
Filed Nov. 26, 1920

INVENTOR
Seraphine F. Bauwens
BY
Edward i. wunel jr.
ATTORNEY

Patented Dec. 4, 1923.

1,476,388

UNITED STATES PATENT OFFICE.

SERAPHINE F. BAUWENS, OF CHICAGO, ILLINOIS, ASSIGNOR TO WIREBOUNDS PATENTS COMPANY, A CORPORATION OF MAINE.

WIRE-JOINING TOOL.

Application filed November 26, 1920. Serial No. 426,593.

*To all whom it may concern:*

Be it known that SERAPHINE F. BAUWENS, a citizen of the United States, and a resident of Chicago, county of Cook, in the State of Illinois, has invented an Improvement in Wire-Joining Tools, of which the following description, in connection with the accompanying drawings, is a specification, like characters on the drawings representing like parts.

This machine relates to wire working and to tools devices or machines for use in joining wires, wire bindings or wire ties on or about boxes, box parts, bales, bundles, packages or the like.

Among other objects the invention is intended to provide a tool or device adapted to readily receive ends of wires to be joined and produce a strong efficient joinder therebetween. Another object is to provide such a tool with means to preliminarily tension the wire about the box or package. Still another object is to provide such a tool with means to sever the ends of the wires in such a manner as to leave them free of objectionable sharp edges or points.

The invention will be clearly understood from the following description with reference to one illustrative tool containing an embodiment of the invention shown in the accompanying drawings:

A simple form of hand tool is selected for illustration, it being understood, however, that the invention is not limited to the specific illustrative form, nor to a hand tool.

Referring to the drawings—

Fig. 1 is a side elevation of the illustrative tool with the jaws open to receive the wire ends to be operated upon.

Fig. 2 is a similar view seen from the left in Fig. 1 and showing the tool turned on its long axis at right angles to the position shown in Fig. 1. The position of the hand lever when the jaws of the tool are closed is shown in dotted lines.

Fig. 3 is an end view of the nose of the tool seen from A—A in Fig. 1.

Fig. 4 is a similar view showing the jaws partially closed.

Fig. 5 is a similar view showing the jaws closed.

Figs. 6, 7, 8 and 9 are longitudinal sectional views of the twister jaws taken on the line B—B of Fig. 2, and show the position of the parts during different stages of the operation of the tool.

Fig. 10 is a sectional view taken on the line C—C of Fig. 8.

Figure 11:
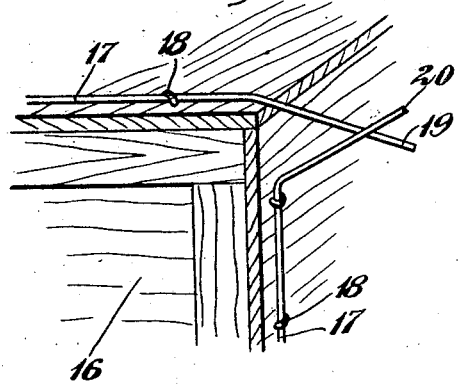

Fig. 11 is a perspective view of a corner portion of an ordinary wirebound box. The wires or wire ends on the lid and front side of which are to be tensionally joined to complete the continuity of the wire binding, and hold the lid firmly closed.

Figure 12:
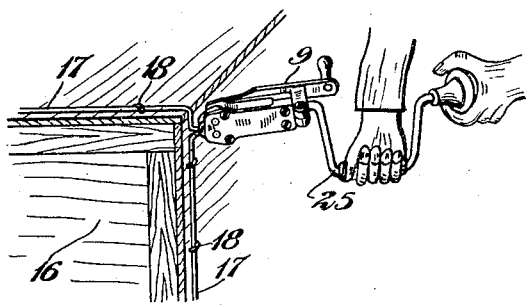

Fig. 12 is a perspective view illustrating the use of the illustrative tool in joining the said wire ends.

Figure 13:
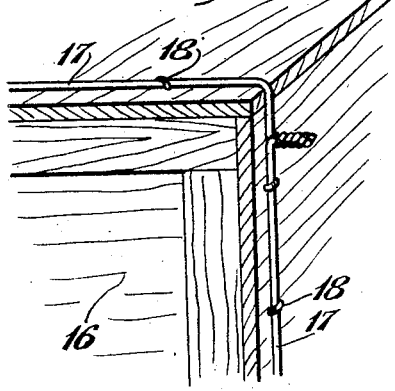

Fig. 13 is a perspective view of the box corner after the production of the joinder made by intertwisting the wire ends.

Figure 14:
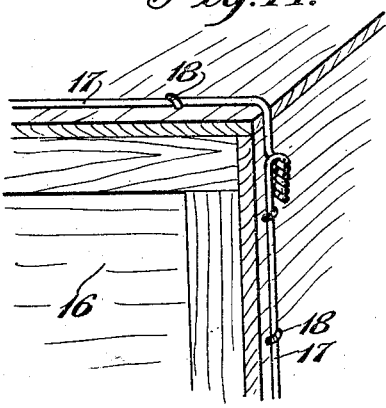

Fig. 14 is a similar view after the twisted wires have been hammered down against the side of the box.

The illustrative tool comprises a pair of relative removable jaws 1 and 2 carried between side plates 3 and 4 which are connected and supported by cross members 5 and screws 6. Jaws 1 and 2 are mounted respectively on pins 7 and 8 which are revolubly mounted in the side plates 3 and 4 so that jaws 1 and 2 are free to revolve between said side plates. Said jaws are so constructed and arranged that when expanded as shown in Figs. 3 and 6, an opening is provided to receive the wire ends to be intertwisted and when contracted as shown in Figs. 5 and 7 the jaws constitute a bore or barrel within which the wires are held side by side and intertwisted by rotation of the tool. The tool may be rotated in any suitable manner as for instance by a brace 25 attached to side plates 3 and 4.

For contracting or closing the jaws 1 and 2 upon the wire, a lever 9 is bolted to pin 7 which carries jaw 1, and jaws 1 and 2 are provided with intermeshing gears 10 so that when lever 9 is swung from the position shown in Fig. 1 to the position shown in dotted lines in Fig. 2, jaws 1 and 2 will revolve until their extremities engage one another as shown in Fig. 7 forming the bore or barrel above referred to.

Referring to Figs. 7, 8, 9 and 10, it will be noted that jaws 1 and 2 are provided respectively with gripping surfaces 11 and 12 constructed and arranged to close upon the wires and grip them in such a manner as to prevent one wire from passing around the other when the tool is rotated. Said gripping surfaces are located a distance from the extremities of said jaws approximately equal to the length of a desired twist, and when the twist is completed said surfaces are adapted to wring off, or sever the wires at the gripping point in such a manner as to leave no sharp edges.

The nose of the bore or barrel formed by jaws 1 and 2 when closed, acts as a gauge to position the gripping surfaces 11 and 12 relative to the body of the box and also holds the wires together at the body of the box so that the nose and said jaws, and the gripping surfaces 11 and 12 function as a plurality of wires engaging means spaced apart a distance approximately equal to the desired length of twist; with the wires so held, the formation of the twist, instead of proceeding from the gripping surfaces toward the box or from the box toward the gripping surfaces, takes place approximately uniformly along the entire length of wire between the box and gripping surfaces, and at each turn of the tool, the wires tension uniformly, resulting in each convolution of the twist being uniformly tensioned.

While the twisting operation itself causes a tensioning of the wire about the box or package, it has been found desirable to increase such tensioning. Provision is made, therefore, to preliminarily tension the wire about the box or package before the ends thereof are twisted together. Such tensioning means comprises knurled surfaces 13 and 14 formed on the inner faces of the jaws 1 and 2 respectively, which surfaces grip the wires and draw the same into the tool when the jaws are being swung to a closed position thus drawing the wire tightly about the box or package and tensioning the same. This preliminary tensioning is particularly advantageous when the wire binding is loosely applied to the box or package, as it enables the operator quickly and easily to take up the slack in the wire and tension the same about the box or package before twisting the ends thereof together.

In the use of the tool for joining, for instance, the ends of a wire binding about a box, the end portions of the wire are brought together as shown in Fig. 11, and the opening formed by jaws 1 and 2 is slipped over the wire ends. The jaws and wires are then in the position shown in Fig. 6. The lever 9 is then swung to the position shown in dotted lines in Fig. 2 swinging jaws 1 and 2 to the closed position shown in Fig. 7. During this operation the knurled surfaces 13 and 14 draw the wire tightly over the box corner and the gripping surfaces 11 and 12 close upon the wires and are positioned by the nose of the tool relative to the box side. When jaws 1 and 2 are thus contracted gripping the wires between gripping surfaces 11 and 12 and forming a bore or barrel incasing the wire, as shown in Fig. 7, the tool is rotated a number of times by turning the handle of the brace to intertwist the wires between the box and gripping surfaces; and when the twist is completed, that is, when the tightening of its convolutions develops a certain degree of resistance against further twisting action as shown in Fig. 8 the continued rotation of the tool will cause the gripping surfaces to disrupt or distort the metal of the wires, and sever the terminal of the twist as shown in Fig. 9, thus, automatically disengaging the tool from the wire.

The severing of the wires at the point of gripping may result from a combined squeezing, tearing, wrenching, shearing, and swaging, or according to particular designs of different specific tools embodying features of this invention, it may depend mainly upon one or more of such factors. Apparently, the butt end of the twist functions as an anvil against which the wires are swaged by the gripping surfaces. The tightness of the convolutions of the twist, and the time of the severing operation may depend upon the degree of pressure exerted upon the wire by the gripping surfaces or by the form of the gripping surfaces or both; that is, if the tool is so designed that the gripping surfaces when contracted exert a heavy pressure on the wires, the severing operation will occur sooner than it would if the wires were more lightly gripped, and it has been found in practice that if the gripping surfaces are so formed as to grip the wires with sharp or pointed surfaces, the twist will not be as tight, and the severing operation will occur at an earlier period in the operation of the tool.

For maintaining a constant pressure on the wires at the gripping point, and to facilitate handling the tool, an adjustable split clamp 15 of any suitable design may be provided having a suitable notch into which the lever 9 may snap to lock the lever 9 when the jaws are closed.

The manner of handling the tool is illustrated in Figures 11 to 14. In these figures, 16 designates a wirebound box having wire binding 17 fastened thereabout by staples 18; the portions of said wire binding on adjacent separably related box sides or sections e. g., the lid and front having free end portions 19 and 20 which are to be tensionally connected to complete the continuity of the binding and tightly close the box. As indicated in Fig. 11, the wire ends 19 and 20 are brought together so that the tool may be slipped thereover. As shown in Fig. 12, the tool has been slipped over wire ends 19 and 20, and the lever 9 has been drawn back and locked by the clamp 15, thus, drawing in the wire between knurled surfaces 13 and 14 and preliminarily tensioning the wire over the box corner. The tool is then rotated by turning the brace to intertwist the wires, and when the twisting is completed, the wire is automatically wrung off at the tip of the twist which may be hammered down against the box as shown in Fig. 14.

Obviously, the present invention is not limited to the specific embodiment illustrated and described, but features of the invention are susceptible of embodiment in various devices, and may be advantageously used in various combinations and sub-combinations.

What is claimed is:

1. A tool for use in joining package wires by intertwisting, comprising, in combination, a plurality of wire engaging means spaced apart a distance approximately equal to the desired length of a twist, at least one such means arranged to be rotated relatively to the wire to produce the twist; and means for preliminarily tensioning the wire.

2. A tool for use in joining package wires by intertwisting, comprising a plurality of wire engaging means spaced apart a distance approximately the length of a desired twist, and adapted for intertwisting portions of the wire throughout such length, one such means designed to perform a wire severing action upon completion of the desired twist; and means for preliminarily tensioning the wire.

3. A tool for joining package wires by intertwisting, comprising wire gripping means to receive the wire end portions and by rotation to intertwist them; means to preliminarily tension the wire; and means causing the production of the twist to tension the wire against the gripping means, said tensioning and gripping means cooperating to cause a wire severing operation upon development of a determined twisting resistance.

4. A tool for joining package wires by intertwisting their end portions, comprising means to preliminarily tension the wire; a rotatable twist forming device; and gauging means automatically discontinuing the twist upon production of a predetermined resistance.

5. A tool for joining package wires by intertwisting their ends, comprising means to preliminarily tension the wire; wire gripping means rotatable for twisting said ends, and gauging means positioning said gripping means, said gripping and gauging means cooperating to produce a determined twist and sever its tip.

6. A tool for joining package wires by forming their ends into an intertwisted projection, comprising means to preliminarily tension the wire, and a twist forming device having means to sever the tip of the twist.

7. A tool for joining package wires comprising means to preliminarily tension the wire; a rotatable means to grip and intertwist the wire ends projected in the same direction from the package; and means holding the gripping means at a determined distance from the package during the twisting operation, whereby the tightening of the twist tensions the wire oppositely from the package and the gripping means.

8. A tool for joining package wires by twisting, comprising means to preliminarily tension the wire; rotatable wire gripping means to produce the twist; and means positioning the wires and holding them from winding one about the other at a distance from said gripping means; whereby the twist forms evenly throughout the distance between the gripping and positioning means, and with each turn or convolution of the twist uniformly tensioned.

9. A twisting tool rotatable on a pair of wire strands as an axis adapted to intertwist said strands and sever them at the end of the twist, said tool having means to draw the wire into the tool; members cooperating to grip said strands and hold them in close relationship, said members having a gripping surface of insufficient extent to turn the wires against a predetermined resistance developed by the twist and adapted when such resistance develops to bite into and sever the strands at the terminal of the twist.

10. A tool for use in joining package wires comprising means to fasten the free ends of the wire, having provision for preliminarily tensioning said wire before the fastening operation, and provision for tensioning said wire during the fastening operation, and for severing the wire ends.

11. A tool for joining package wires, comprising means for preliminarily tensioning the wire; means to engage the wire end portions, and by rotation twist them together and sever the strands at the end of the twist; and gauging means automatically to control the length of the twist and the point of severing.

12. In a tool for use in twisting the end strands of a package encircling wire binding, means to preliminarily tension the wire about the package; means to gauge the length of the twist and means automatically to sever the strands at the end of said twist.

13. A tool for use in joining wires by intertwisting, comprising means to draw the wire into the tool; twisting means to embrace the wires; and cooperating means to cause the twist to form gradually and evenly along the length of the wires.

14. A tool for use in joining wires by intertwisting, comprising means to draw the wire into the tool; twisting means to embrace the wire ends; and means determining the formation of the twist, said twisting means adapted for and controlled by said 15. A tool for joining package wires by intertwisting, comprising means to tension the wire about the package; means to receive the wire end portions and, by rotation, to intertwist them; and means causing the production of the twist to increase the tension of the wire about the package.

16. A tool for joining package wires by intertwisting, comprising means to tension the wire about the package; wire gripping means to receive the wire end portions and, by rotation, to intertwist them; and means to position the gripping means relative to the package whereby the production of the twist will increase the tension of the wire about the package.

17. A tool for joining package wires by intertwisting, comprising means to tension the wire about the package; wire gripping means to receive the wire end portions, and, by rotation, to intertwist them; and means to position the gripping means relative to the package whereby the production of the twist will increase the tension of the wire about the package in accordance with the position of the gripping means relative to the package.

18. A tool for joining package wires by intertwisting, comprising means to preliminarily tension the wire about the package; wire gripping means to receive the wire end portions and, by rotation, to intertwist them; and means to position said gripping means relative to the package.

19. A tool for joining package wires by intertwisting, comprising means to tension the wire about the package; wire gripping means to receive the wire end portions and, by rotation, to intertwist them; and means causing the production of the twist to increase the tension of the wire about the package; said wire-gripping means functioning to sever the tip of the completed twist.

20. A tool for joining package wires by intertwisting their ends, comprising means to preliminarily tension the wire about the package, and a twist forming device including relatively movable gripping members adapted to sever the tip of the twist.

21. A tool for joining package wires by intertwisting, comprising a twist forming device including relatively movable members adapted to draw the wire ends into the tool and, by rotation, to intertwist them and sever the tip of the twist.

22. A tool for joining package wires by intertwisting their ends, comprising a twist forming device including relatively movable members adapted to draw the wire ends into the tool, grip them at a determined point relative to the edge of the package and, by rotation, to intertwist them and sever the wire at the gripping point.

23. A tool for joining package wires by forming their ends into an intertwisted projection comprising the relatively movable jaws 1 and 2 having the tensioning surfaces 13 and 14 and the gripping surfaces 11 and 12 and the lever 9 for relatively moving said jaws.

24. A tool for joining package wires by intertwisting comprising relatively movable members to receive and hold the wires side by side, means to position said members a distance from the package during the operation of the tool whereby rotation of said members will cause the wires to be intertwisted and severed, and means to cause relative movement of said members including a manually operable lever.

In testimony whereof, I have signed my name to this specification.

SERAPHINE F. BAUWENS.